United States Patent
Parkvall et al.

(10) Patent No.: US 9,585,042 B2
(45) Date of Patent: *Feb. 28, 2017

(54) MULTI-CARRIER CQI FEEDBACK METHOD AND APPARATUS

(71) Applicant: Telefonaktiebolaget LM Ericsson (Publ), Stockholm (SE)

(72) Inventors: Stefan Parkvall, Bromma (SE); Erik Dahlman, Bromma (SE); Bo Göransson, Sollentuna (SE); Joakim Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,301

(22) Filed: Oct. 15, 2015

(65) Prior Publication Data

US 2016/0037369 A1 Feb. 4, 2016

Related U.S. Application Data

(63) Continuation of application No. 14/307,607, filed on Jun. 18, 2014, now Pat. No. 9,191,847, which is a
(Continued)

(51) Int. Cl.
*H04W 24/08* (2009.01)
*H04W 72/04* (2009.01)
(Continued)

(52) U.S. Cl.
CPC ........... *H04W 24/08* (2013.01); *H04W 24/10* (2013.01); *H04W 72/0413* (2013.01); *H04W 72/0453* (2013.01); *H04W 72/085* (2013.01)

(58) Field of Classification Search
CPC ..... H04W 24/08; H04W 24/10; H04W 72/08; H04W 72/085
See application file for complete search history.

(56) References Cited

U.S. PATENT DOCUMENTS 7,593,363 B2 * 9/2009 Dottling ............... H04L 1/1671
370/328
2003/0002472 A1 1/2003 Choi et al.
(Continued)

FOREIGN PATENT DOCUMENTS

WO 2006113633 A2 10/2006

OTHER PUBLICATIONS

3rd Generation Partenership Project. "Reduced CQI Design for DL SU-MIMO." 3GPP TSG RAN WG1 Meeting #48, R1-070994, St. Louis, USA, Feb. 12-16, 2007, pp. 1-7.
(Continued)

*Primary Examiner* — Redentor Pasia
(74) *Attorney, Agent, or Firm* — Coats & Bennett, P.L.L.C.

(57) ABSTRACT

A radio base station transmits data symbols to a mobile terminal on multiple frequency carriers, e.g., in accordance with the MC-WCDMA or cdma2000 3× air interface protocols. The radio base station instructs the mobile terminal to report channel quality measurements obtained by the terminal for the multiple carriers over the same uplink channel during successive reporting intervals. According to one embodiment, the mobile terminal reports channel quality by receiving data symbols transmitted on a plurality of frequency carriers in a multi-carrier CDMA environment and measuring channel quality for the different frequency carriers. The mobile terminal reports individual ones of the channel quality measurements over the same uplink channel during successive reporting intervals.

32 Claims, 4 Drawing Sheets

Related U.S. Application Data continuation of application No. 11/948,085, filed on Nov. 30, 2007, now Pat. No. 8,797,889.

(60) Provisional application No. 60/911,636, filed on Apr. 13, 2007.

(51) Int. Cl.
*H04W 72/08* (2009.01)
*H04W 24/10* (2009.01)

(56) References Cited

U.S. PATENT DOCUMENTS

| | | | |
|---|---|---|---|
| 2003/0054847 A1* | 3/2003 | Kim | H04W 52/226 455/517 |
| 2003/0092456 A1 | 5/2003 | Dent et al. | |
| 2003/0125040 A1 | 7/2003 | Walton et al. | |
| 2003/0148770 A1 | 8/2003 | Das et al. | |
| 2004/0022213 A1* | 2/2004 | Choi | H04W 24/10 370/332 |
| 2005/0064908 A1* | 3/2005 | Boariu | H04B 7/061 455/562.1 |
| 2005/0111406 A1 | 5/2005 | Pasanen et al. | |
| 2005/0201296 A1 | 9/2005 | Vannithamby et al. | |
| 2005/0207367 A1* | 9/2005 | Onggosanusi | H04L 1/0003 370/315 |
| 2007/0010957 A1 | 1/2007 | Sampath et al. | |
| 2007/0091817 A1* | 4/2007 | Yoon | H04L 1/0026 370/252 |
| 2007/0117569 A1* | 5/2007 | Ovadia | H04W 28/16 455/450 |
| 2008/0026744 A1 | 1/2008 | Frederiksen et al. | |
| 2008/0076427 A1 | 3/2008 | Huang et al. | |
| 2008/0130613 A1 | 6/2008 | Tiedemann et al. | |

OTHER PUBLICATIONS

3rd Generation Partenership Project. "Comparison of Channel Quality Reporting Schemes." 3GPP TSG RAN WG1 #23, R1-020152, Korpilampi, Finland, Jan. 8-11, 2002, pp. 1-5.

3rd Generation Partenership Project. "Overhead Reduction of Best-M Based CQI Reporting." 3GPP TSG RAN WG1 RAN1 Meeting #47, R1-063086, Riga, Latvia, Nov. 6-10, 2006, pp. 1-4.

\* cited by examiner

MULTI-CARRIER CQI FEEDBACK METHOD AND APPARATUS

RELATED APPLICATIONS

This application is a continuation of U.S. patent application Ser. No. 14/307,607 filed Jun. 18, 2014, which is a continuation of U.S. patent application Ser. No. 11/948,085 filed Nov. 30, 2007, which claims priority to U.S. Provisional Patent Application No. 60/911,636 filed Apr. 13, 2007, the contents of each of which are incorporated herein by reference in its entirety.

BACKGROUND

The present invention generally relates to channel quality reporting, and particularly relates to channel quality reporting in a multi-carrier wireless communication environment.

Currently, the 3rd Generation Partnership Project (3GPP) is initiating work on evolving the Wideband CDMA standard (WCDMA). This evolution aims at improving packet data transmission performance, e.g., through higher throughput, increased data rates, reduced delays, and support for flexible spectrum allocation. Of particular interest is higher bandwidth support for packet data services.

One candidate for this evolution is a multi-carrier WCDMA (MC-WCDMA) based air-interface. A MC-WCDMA air interface protocol provides multiple WCDMA frequency carriers operating in parallel. As an example, MC-WCDMA could offer up to four parallel frequency carriers in the downlink direction, each carrier having a chip rate of 3.84 Mcps, corresponding to approximately 5 MHz bandwidth. A similar approach is taken for cdma2000, where a multi-carrier mode is specified. Normally, cdma2000 uses a single carrier, known as cdma2000 1×. However, cdma2000 provides a multi-carrier mode denoted as cdma2000 3×. Three frequency carriers are used in parallel according to cdma2000 3×.

An MC-WCDMA compatible terminal is capable of receiving multiple frequency carriers, while a conventional WCDMA terminal is only capable of receiving a single carrier and is not aware of other carriers. This ensures that MC-WCDMA is backward compatible with conventional WCDMA.

WCDMA also has been enhanced with High-Speed Downlink Packet Access (HSDPA) for efficient downlink packet-data support (Rel-5 of the WCDMA specification). Based on HSDPA, the WCDMA specifications identify a new downlink transport channel, the high-speed downlink shared channel (HS-DSCH). HS-DSCH is based on a shared channel transmission scheme. A certain amount of channelization codes and transmission power in a cell can be considered a common resource that is dynamically shared among users primarily in the time domain when a shared channel transmission scheme such as HS-DSCH is deployed. Shared-channel transmission makes more efficient use of available code resources in WCDMA. For example, the shared code resource onto which the HS-DSCH is mapped consists of up to 15 codes with fixed spreading factor 16. The HS-DSCH also supports new features such as fast link adaptation, fast hybrid ARQ with soft combining, and fast channel-dependent scheduling that rely on, and are tightly coupled to, the rapid adaptation of transmission parameters to instantaneous radio conditions.

Fast link adaptation enables the HS-DSCH to rely on rate adjustment while transmission power is kept constant instead of compensating for significantly and rapidly varying downlink radio conditions by power control. This is commonly known as rate adaptation, rate control, or link adaptation and is more efficient than power control for services tolerating short-term variations in the data rate. Furthermore, the HS-DSCH may use spectral-efficient 16 or 64 QAM modulation when channel conditions permit in order to further increase the capacity and data rates.

Fast hybrid ARQ with soft combining enables a mobile terminal to rapidly request retransmission of erroneous data, which leads to substantial delay reduction and also higher capacity compared to release 99 of WCDMA. By using soft combining, the mobile terminal combines information from both the original transmission and any subsequent retransmissions prior to a decoding attempt. This further increases the capacity and adds robustness against link adaptation errors.

Fast channel-dependent scheduling allows a scheduler to control to which users the shared channel transmission should be directed at a given time instant. Channel-dependent scheduling implies that the instantaneous radio-channel conditions are taken into account during the scheduling process, which significantly increases capacity and resource utilization. Short-term variations in the radio conditions are exploited by transmitting to a user which experiences favorable instantaneous channel conditions, e.g., a fading peak, while a certain degree of fairness is still maintained over the long term. To fulfill the requirements on short delays and rapid adaptation set by the techniques discussed above, the corresponding functionality is typically located in the Node B of a radio access network.

HSDPA also provides a new downlink control channel for WCDMA, the High-Speed Shared Control Channel (HS-SCCH), which is code multiplexed with the HS-DSCH. HS-SCCH carries control information necessary for the demodulation of the HS-DSCH by a mobile terminal. The control information, which is required for each 2 ms WCDMA Transmission Time Interval (TTI), includes the identity of the currently scheduled terminal, hybrid ARQ related information, and HS-DSCH transport format parameters selected by the link adaptation mechanism. The HS-DSCH is shared mainly in the time domain but can also be shared in the code domain. Time domain scheduling makes the most use of the rapid adaptations possible with the HSDPA feature, but when data transmitted to one mobile terminal does not completely fill the HS-DSCH channel, several mobile terminals may be scheduled at the same time using different subsets of the available codes (code domain sharing). Since only the currently scheduled terminal needs to receive the HS-SCCH, there is typically only one, or a few HS-SCCHs configured in each cell. However, HS-DSCH capable terminals are required to monitor up to four HS-SCCHs.

The HS-DSCH and HS-SCCH use staggered timing. The staggered timing structure reduces mobile terminal complexity since it allows the terminal to receive parts of the control information and to use the information to configure its HS-DSCH receiver before beginning to receive the HS-DSCH transmission. However, a more complicated power allocation algorithm is needed in the base station when the HS-DSCH and HS-SCCH are transmitted using staggered timing. With staggering, subsequent HS-DSCH transmission activity must be taken into account when the HS-SCCH power is set. This may require a static HS-SCCH power reservation, leading to reduced system capacity. Staggering also introduces an additional and seemingly unnecessary delay for user data.

HSDPA further provides a new uplink control channel for WCDMA, the High Speed Dedicated Control Physical Channel (HS-DPCCH), which is provided to each terminal using HS-DSCH services. The HS-DPCCH is used by the hybrid ARQ mechanism in the mobile terminal to request retransmissions of erroneously received transport blocks. The HS-DPCCH is also used to transmit reports of the instantaneous downlink channel quality observed by the mobile terminal to the corresponding Radio Base Station (RBS). Instantaneous channel quality conditions are conventionally measured by devices such as cellular phones and are broadly referred to as Channel Quality Indicators (CQIs). CQI values may correspond to Signal-to-Noise Ratio (SNR), Signal-to-Interference+Noise Ratio (SINR), received signal power or strength level, supportable data rates, supportable modulation and/or coding rates, supportable throughput, etc.

CQI information is conventionally transmitted from a wireless receiver such as a cellular phone to a corresponding transmitter such as an RBS via physical layer signaling. In one example, CQI information is transmitted over the HS-DPCCH in compliance with the HSDPA protocol for WCDMA-based systems. Wireless transmission systems use CQI information to assist in radio resource allocation. For example, CQI information may be used to determine transmission scheduling among multiple receivers, select suitable transmission schemes (e.g., the number of transmit antennas to activate), determine bandwidth allocation, select spreading codes, determine modulation and coding rates, etc.

CQI information is conventionally transmitted in the form of a CQI message. Receivers form CQI messages by first measuring channel quality, e.g., SNR or SINR. The receiver then accesses a standardized CQI table where the table contains ranges of uniquely indexed CQI values. The range in which the measured channel quality falls is identified by selecting the corresponding index value. The selected index value is mapped to a sequence of channel quality information bits, e.g., using a (20.5) block coding technique where 5 bits are encoded into a 20 bit-codeword for error protection. The encoded channel quality information bits are then mapped onto the HS-DPCCH and transmitted as a message.

The HSDPA features described above provide channel quality feedback for a single downlink carrier in a MC-WCDMA environment. That is, the current HS-DPCCH physical channel structure only supports feedback of one CQI value per 2 ms interval, corresponding to one downlink carrier. However, channel quality feedback is desired for all carriers in a MC-WCDMA system to take full advantage of the advanced radio communication features offered by HSDPA.

SUMMARY

According to the methods and apparatus taught herein, a radio base station transmits information to a mobile terminal on multiple frequency carriers, e.g., in accordance with the MC-WCDMA or cdma2000 3× air interface protocols. The radio base station instructs the mobile terminal to report channel quality measurements obtained by the terminal for the multiple carriers over the same uplink channel during successive reporting intervals. Channel quality measurements may be individually reported during consecutive reporting intervals. Alternatively, one or more reporting intervals may be skipped between reports.

The radio base station may instruct the mobile terminal to report channel quality measurements in a particular order. Alternatively, the mobile terminal may rank channel quality measurements and report the measurements based on this ranking. This way, the best channel quality measurements are reported to the radio base station before lesser measurements are reported. Regardless, only a single uplink communication channel is used to communicate channel quality information to the radio base station for multiple frequency carriers, efficiently using radio resources. The radio base station reallocates radio resources as appropriate based on channel quality reports individually received during successive reporting intervals.

According to one embodiment, a mobile terminal reports channel quality by receiving data symbols transmitted on a plurality of frequency carriers in a multi-carrier CDMA environment and measuring channel quality for the different frequency carriers. The mobile terminal reports individual ones of the channel quality measurements over the same uplink channel during successive reporting intervals.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
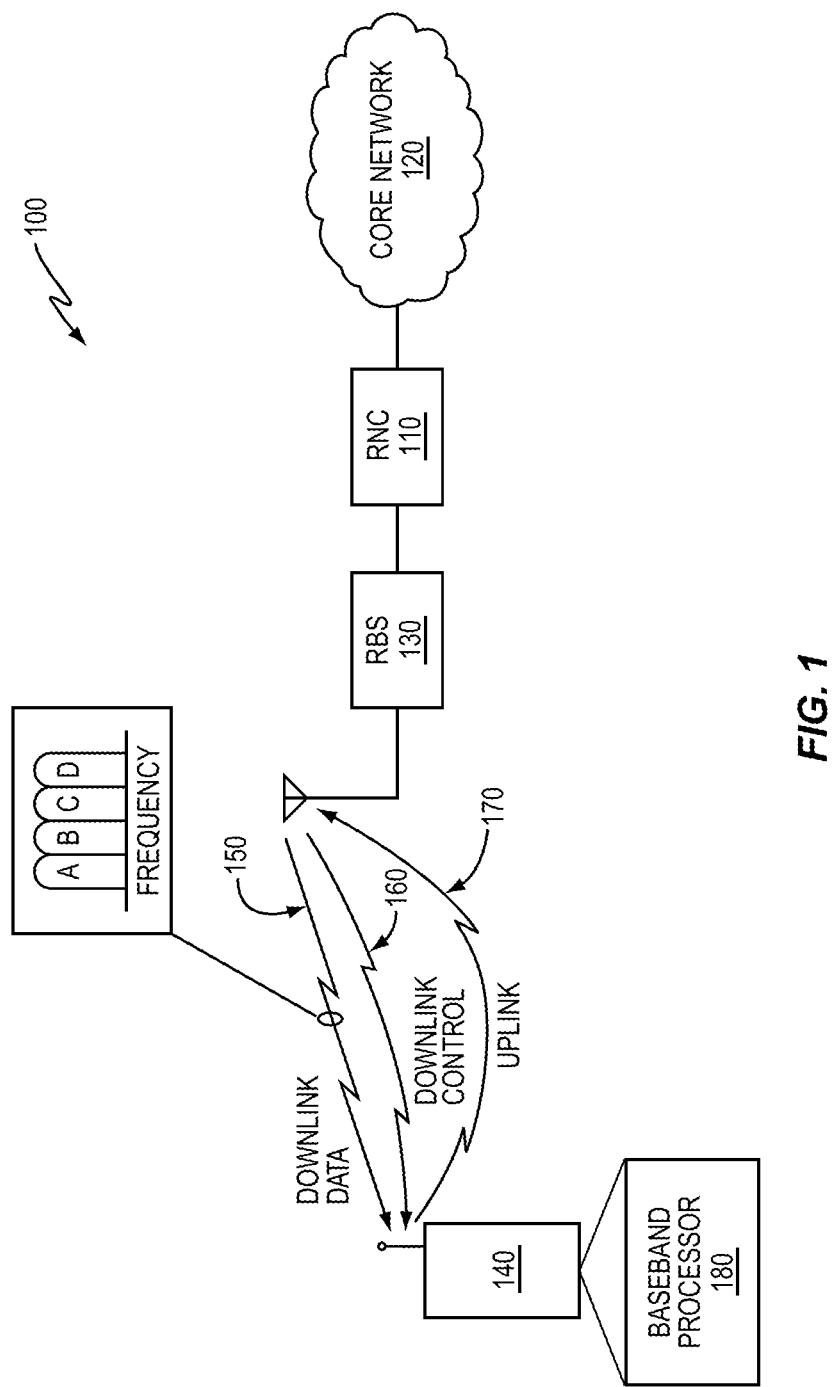
FIG. 1 is a block diagram of an embodiment of a multi-carrier wireless communication system.

FIG. 1 partially illustrates an embodiment of a wireless communication system 100 including one or more Radio Network Controllers (RNCs) 110 coupled to a core radio network 120 such as a GSM core network. Each RNC 110 is also coupled to one or more Radio Base Stations (RBSs) 130. Operation of the wireless communication system 100 is described herein with reference to the MC-WCDMA air interface protocol. However, the embodiments disclosed herein are readily applicable to other multi-carrier wireless communication topologies that transmit data symbols on a plurality of frequency carriers such as cdma2000 3×. With this in mind, each RNC 110 controls WCDMA radio access network functions and connects the WCDMA network to the core network 120. Each RBS 130 provides a wireless interface to mobile terminals 140 serviced by the system 100.

Figure 2:
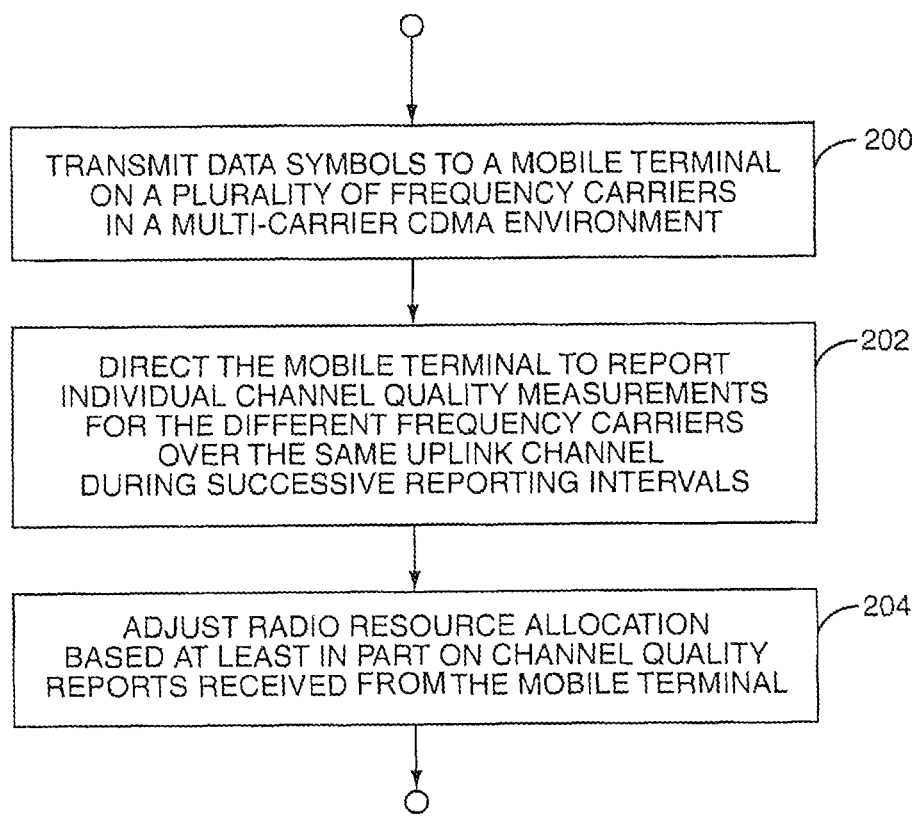
FIG. 2 illustrates an embodiment of processing logic for directing a mobile terminal to report channel quality measurements obtained for multiple frequency carriers.

An RBS 130 transmits data symbols to a mobile terminal 140 on a plurality of frequency carriers, e.g., as illustrated by Step 200 of FIG. 2. In FIG. 1, data symbols are transmitted on four MC-WCDMA frequency carriers A, B, C and D. Each MC-WCDMA frequency carrier has a chip rate of 3.84 Mcps and a bandwidth of approximately 5 MHz bandwidth. However, data symbols may be transmitted on any supportable number and type of frequency carriers. Regardless, the mobile terminal 140 receives and demodulates data symbols received from the frequency carriers.

The RBS 130 establishes one or more downlink communication channels 150 with the mobile terminal 140 to transmit data symbols to the terminal 140 using multiple frequency carriers. For MC-WCDMA, this involves establishing one or more HS-DSCHs. The mobile terminal 140 monitors one or more downlink control channels 160 to determine when downlink channel resources have been allocated to the mobile terminal 140 as is well known in the art. For MC-WCDMA, the mobile terminal 140 monitors one or more HS-SCCHs, where each HS-SCCH provides control information associated with a corresponding HS-DSCH.

When multi-carrier downlink channel resources are allocated to the mobile terminal 140, the RBS 130 instructs the terminal 140 how channel quality measurements obtained by the terminal 140 for the different carriers should be reported back to the RBS 130, e.g., as illustrated by Step 202 of FIG. 2. Instead of using a different uplink control channel to report channel quality measurements for each frequency carrier, the RBS 130 instructs the mobile terminal 140 to report all channel quality measurements over the same uplink control channel 170 during successive reporting intervals. This way, only a single uplink channel 170 is used to transmit channel quality information associated with the different frequency carriers, thus consuming less channel resources. For MC-WCDMA, the RBS 130 instructs the mobile terminal 140 to report channel quality measurements for different ones of the MC-WCDMA frequency carriers over a single HS-DPCCH 170.

According to one embodiment, the RBS 130 provides channel quality reporting instructions to the mobile terminal 140 via higher layer signaling such as during call setup. This way, the mobile terminal 140 is already aware of the channel quality reporting criteria before the terminal 140 begins receiving data symbols transmitted on multiple frequency carriers. In other embodiments, channel quality reporting instructions are provided to the mobile terminal 140 via other signaling techniques, e.g., via an HS-SCCH.

Regardless, the RBS 130 adjusts radio resource allocation based at least in part on channel quality measurements reported by the mobile terminal 140 over the same uplink control channel 170 during successive reporting intervals, e.g., as illustrated by Step 204 of FIG. 2. In one embodiment, the RBS 130 instructs the mobile terminal 140 to measure channel quality for each frequency carrier and to generate a CQI message for each carrier based on the respective channel quality measurements. A baseband processor 180 included in the mobile terminal 140 measures channel quality for the different frequency carriers and builds the corresponding CQI messages. The baseband processor 180 may measure channel quality based on any known technique, e.g., based on received pilot symbols or sequences. Regardless, each CQI message includes the CQI index value corresponding to the respective channel quality measurement. The mobile terminal 140 then individually reports each CQI message to the RBS 130 over the same uplink channel 170 during successive reporting intervals.

In another embodiment, the mobile terminal 140 is instructed to generate a CQI message for the frequency carrier having the best channel quality measurement, i.e., the frequency carrier having the highest channel quality as measured by the mobile terminal 140. For the remaining carriers, the mobile terminal baseband processor 180 determines a delta between the respective channel quality measurements associated with the remaining carriers and the CQI index value previously determined. For example, a CQI message having a CQI index value is generated for a first frequency carrier. The CQI message may be generated using a (20.5) block coding technique where 5 bits are encoded into a 20 bit-codeword for error protection.

The baseband processor 180 also determines CQI index values associated with one or more other frequency carriers. The baseband processor 180 computes the delta between the CQI index value associated with the highest-quality frequency carrier and the other CQI index values. In one embodiment, the baseband processor 180 sets one or more message bits to indicate the delta value range. For example, if one additional bit is provided, the range is ±two CQI index values, for two bits, the range is ±four CQI index values, etc. Broadly, the range of index delta values corresponds to $2^n$ where n is the number of bits allocated for the range.

The CQI message associated with the highest-quality frequency carrier is then transmitted over the uplink control channel 170 during a first reporting interval. The index delta values associated with the lesser-quality frequency carriers are individually transmitted over the same uplink channel 170 during subsequent, successive reporting intervals. This way, the overall error rate associated with reporting channel quality information to the RBS 130 is reduced because the index delta values can be coded using fewer bits than actual CQI index values. The RBS 130 uses the received CQI message and index delta values to reconstruct the CQI index values for all frequency carriers of interest, e.g., by adding or subtracting each index delta value from the CQI index included in the received CQI message.

In yet another embodiment, the baseband processor 180 reports the CQI value for the "main" carrier (e.g., the carrier containing legacy traffic). Delta CQI values are then reported for the remaining carriers. This may yield CQI values at the RBS 130 that are higher or lower than that of the main carrier.

Described next are various embodiments for instructing the mobile terminal 140 how to report channel quality measurements (CQIs) to the RBS 130 over the same uplink control channel 170 during successive reporting intervals. In each of these embodiments, the mobile terminal 140 may report CQI index values for each frequency carrier of interest as previously described herein. Alternatively, the mobile terminal 140 may report a CQI index value for the frequency carrier having the best channel quality measurement and report deltas from the CQI index value for the lesser-quality carriers of interest, also as previously described herein. The various channel quality reporting embodiments described next make reference to CQIs where CQI may broadly refer to an actual CQI index value, a delta between CQI index values, or other channel quality measurements obtained by the mobile terminal 140 such as SNR, SINR, received signal power or strength measurement, etc.

Figure 3:
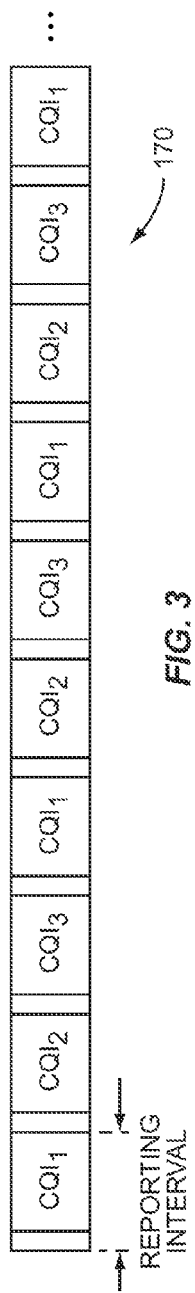
FIG. 3 is a block diagram of an embodiment of a single uplink communication channel for reporting channel quality measurements obtained for multiple frequency carriers.

With this in mind, FIG. 3 illustrates one embodiment of how the mobile terminal 140 reports channel quality measurements over the same uplink channel 170 during successive reporting intervals. According to this embodiment, the RBS 130 instructs the mobile terminal 140 to report individual CQIs during consecutive reporting intervals where $CQI_n$ represents the CQI associated with the $n^{th}$ frequency carrier. This way, the RBS 130 receives a channel quality measurement each reporting interval. The order in which the mobile terminal 140 reports CQIs may be identified to the terminal 140 by the RBS 130, e.g., during call setup. The RBS 130 may change CQI reporting order over time depending on reported channel conditions. Changes in CQI reporting order are reported to the mobile terminal 140 so that proper communication is maintained between the RBS 130 and mobile terminal 140.

Figure 4:
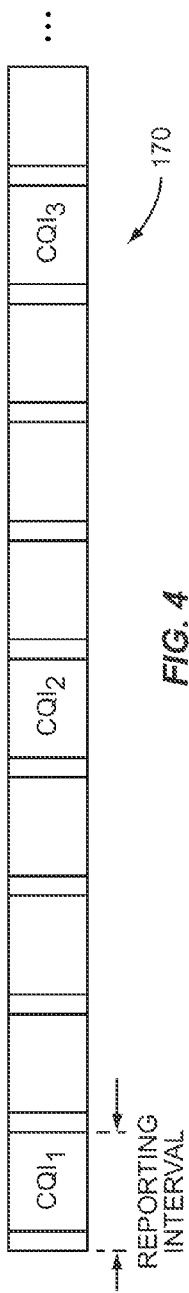
FIG. 4 is a block diagram of another embodiment of a single uplink communication channel for reporting channel quality measurements obtained for multiple frequency carriers.

FIG. 4 illustrates another embodiment of how the mobile terminal 140 reports channel quality measurements over the same uplink channel 170 during successive reporting intervals. According to this embodiment, the RBS 130 instructs the mobile terminal 140 to skip one or more consecutive reporting intervals between successively reported CQIs. Accordingly, the RBS 130 does not receive a channel quality measurement each reporting interval. Instead, gaps exist between successively reported measurements. Again, the order in which CQIs are reported may be altered over time by the RBS 130 and communicated to the mobile terminal 140.

Figure 5:
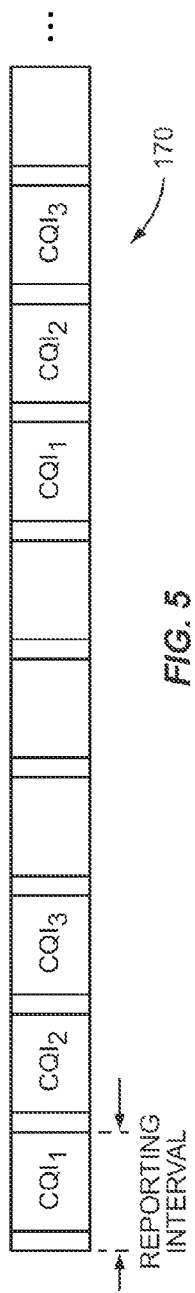
FIG. 5 is a block diagram of yet another embodiment of a single uplink communication channel for reporting channel quality measurements obtained for multiple frequency carriers.

FIG. 5 illustrates yet another embodiment of how the mobile terminal 140 reports channel quality measurements over the same uplink channel 170 during successive reporting intervals. According to this embodiment, the RBS 130 instructs the mobile terminal 140 to individually report initial obtained CQIs during consecutive reporting intervals. The mobile terminal 140 then skips one or more reporting intervals before reporting revised CQIs over the same uplink channel 170 during subsequent, consecutive reporting intervals. This way, the RBS 130 receives channel quality measurements over consecutive reporting intervals with a delay between revised measurements. Once again, the order in which CQIs are reported may be altered over time by the RBS 130.

Figure 6:
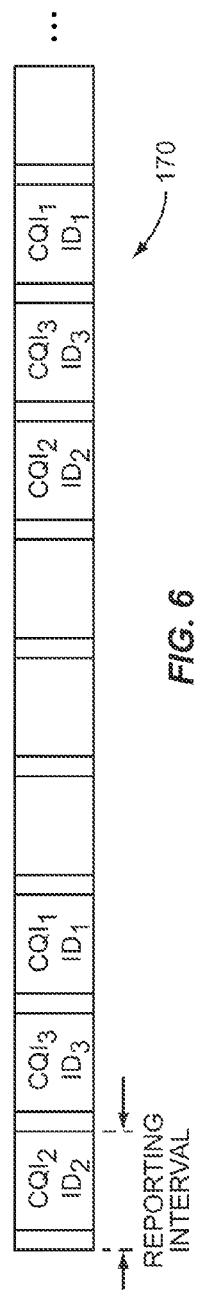
FIG. 6 is a block diagram of still another embodiment of a single uplink communication channel for reporting channel quality measurements obtained for multiple frequency carriers.

FIG. 6 illustrates still another embodiment of how the mobile terminal 140 reports channel quality measurements over the same uplink channel 170 during successive reporting intervals. According to this embodiment, the mobile terminal 140 is instructed to rank CQIs and report them in order based on rank. The mobile terminal 140 also provides a frequency carrier identifier ($ID_n$) along with each reported CQI because the reporting order may change over time as channel conditions vary. The RBS 130 retrieves both the frequency carrier identifier and corresponding CQI during each reporting interval. The RBS 130 uses the retrieved identifiers to determine which frequency carrier is associated with each received CQI. In one embodiment, the RBS 130 accesses a lookup table (not shown) which maps retrieved carrier identifiers to the corresponding frequency carrier. This way, the RBS 130 can meaningfully process received channel quality measurements. Further, the frequency carriers having the best channel quality as measured by the mobile terminal 140 are reported sooner to the RBS 130, thus improving RBS performance.

Figure 7:
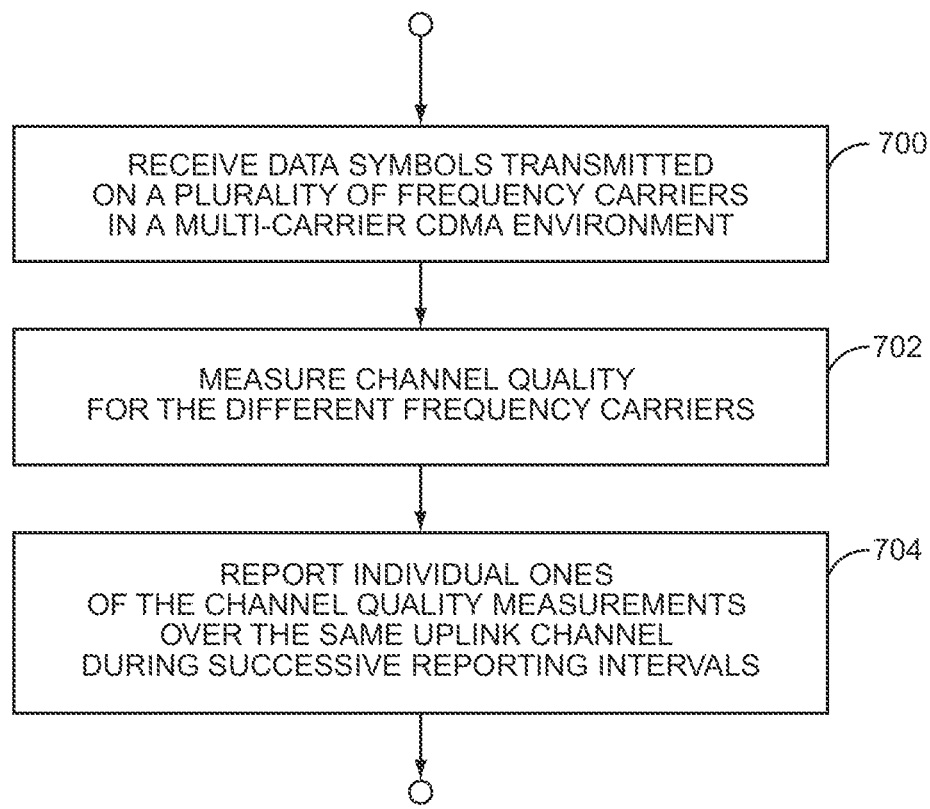
FIG. 7 illustrates an embodiment of processing logic for reporting channel quality measurements obtained for multiple frequency carriers over the same uplink channel.

The mobile terminal 140 reports channel quality measurements in accordance with any of the reporting embodiments previously described herein. To this end, the mobile terminal 140 receives data symbols from the RBS 130 transmitted on a plurality of frequency carriers, e.g., as illustrated by Step 700 of FIG. 7. The mobile terminal baseband processor 180 measures channel quality for the different frequency carriers, e.g., as illustrated by Step 702 of FIG. 7. In one embodiment, the baseband processor 180 determines CQI index values for each frequency carrier of interest as previously described herein. Alternatively, the baseband processor 180 determines a CQI index value for the frequency carrier having the best channel quality measurement and calculates deltas from the CQI index value for the remaining carriers of interest, also as previously described herein. Regardless, the mobile terminal 140 reports individual ones of the channel quality measurements over the same uplink channel 170 during successive reporting intervals, e.g., as illustrated by Step 704 of FIG. 7. In one embodiment, the mobile terminal 140 reports channel quality measurements for all frequency carriers from which the terminal 140 receives data symbols. In another embodiment, the mobile terminal 140 reports only those channel quality measurements that satisfy some threshold criteria indicated by the RBS 130, e.g., the N best channel quality measurements or the channel quality measurements that exceed a threshold limit. According to this embodiment, the mobile terminal 140 may also transmit a frequency carrier identifier along with each reported channel quality measurement as previously described herein because the number of measurements reported and/or the reporting order may change over time. This way, the RBS 130 can meaningfully process received channel quality reports.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method performed by a mobile terminal for reporting channel quality, the method comprising:
   receiving data symbols transmitted on a plurality of frequency carriers in a multi-carrier CDMA environment;
   measuring channel quality for the different frequency carriers;
   reporting individual ones of the channel quality measurements over a same uplink channel during successive reporting intervals by:
   mapping a best channel quality measurement of the individual ones of the channel quality measurements to a channel quality indicator index,
   determining a delta from the channel quality indicator index for one or more of remaining frequency carriers based on its corresponding channel quality measurement, and
   reporting the channel quality indicator index and individual deltas over the same uplink channel during successive reporting intervals;
   receiving a physical layer or MAC layer signaling message from a radio base station directing the mobile terminal to stop reporting one or more channel quality measurements of one or more frequency carriers for one or more reporting intervals over the same uplink channel; and
   stopping, responsive to said physical layer or MAC layer signaling message, reporting one or more channel quality measurements for one or more frequency carriers for one or more reporting intervals.

2. The method of claim 1, wherein reporting individual ones of the channel quality measurements over the same uplink channel during successive reporting intervals comprises reporting only the channel quality measurements that satisfy a threshold criteria.

3. The method of claim 1, wherein reporting individual ones of the channel quality measurements over the same uplink channel during successive reporting intervals comprises reporting individual ones of the channel quality measurements during consecutive reporting intervals.

4. The method of claim 3, further comprising skipping one or more reporting intervals before revised channel quality measurements for the different frequency carriers are subsequently reported over the same uplink channel during consecutive reporting intervals.

5. The method of claim 1, wherein reporting individual ones of the channel quality measurements over the same uplink channel during successive reporting intervals comprises skipping one or more consecutive reporting intervals between successively reported channel quality measurements.

6. The method of claim 1, wherein reporting individual ones of the channel quality measurements over the same uplink channel during successive reporting intervals comprises:
 ranking the channel quality measurements; and
 reporting the channel quality measurements in order based on rank.

7. The method of claim 6, further comprising reporting a frequency carrier identity associated with each reported channel quality measurement.

8. A mobile terminal comprising a baseband processor configured to:
 process received data symbols transmitted on a plurality of frequency carriers in a multi-carrier CDMA environment;
 measure channel quality for the different frequency carriers;
 report individual ones of the channel quality measurements over the same uplink channel during successive reporting intervals by:
  mapping a best channel quality measurement of the individual ones of the channel quality measurements to a channel quality indicator index,
  determining a delta from the channel quality indicator index for one or more of remaining frequency carriers based on its corresponding channel quality measurement, and
  reporting the channel quality indicator index and individual deltas over the same uplink channel during successive reporting intervals;
 receive a physical layer or MAC layer signaling message from a radio base station directing the mobile terminal to stop reporting one or more channel quality measurements of one or more frequency carriers for one or more reporting intervals over the same uplink channel; and
 stop, responsive to said physical layer or MAC layer signaling message, reporting one or more channel quality measurements for one or more frequency carriers for one or more reporting intervals.

9. The mobile terminal of claim 8, wherein the baseband processor is configured to report only the channel quality measurements that satisfy a threshold criteria.

10. The mobile terminal of claim 8, wherein the baseband processor is configured to report individual ones of the channel quality measurements during consecutive reporting intervals.

11. The mobile terminal of claim 10, wherein the baseband processor is configured to skip one or more reporting intervals before revised channel quality measurements for the different frequency carriers are subsequently reported over the same uplink channel during consecutive reporting intervals.

12. The mobile terminal of claim 8, wherein the baseband processor is configured to skip one or more consecutive reporting intervals between successively reported channel quality measurements.

13. The mobile terminal of claim 8, wherein the baseband processor is further configured to rank the channel quality measurements and report the channel quality measurements in order based on rank.

14. The mobile terminal of claim 13, wherein the baseband processor is further configured to report a frequency carrier identity associated with each reported channel quality measurement.

15. A method of allocating radio resources, comprising:
 transmitting data symbols to a mobile terminal on a plurality of frequency carriers in a multi-carrier CDMA environment;
 directing the mobile terminal to report individual channel quality measurements for the different frequency carriers over the same uplink channel during successive reporting intervals, the mobile terminal to report the individual channel quality measurements by:
  mapping a best channel quality measurement of the individual ones of the channel quality measurements to a channel quality indicator index,
  determining a delta from the channel quality indicator index for one or more of remaining frequency carriers based on its corresponding channel quality measurement, and
  reporting the channel quality indicator index and individual deltas over the same uplink channel during successive reporting intervals;
 directing the mobile terminal, via a physical layer or MAC layer signaling message, to stop reporting channel quality measurements for one or more reporting intervals for one or more frequency carriers over the same uplink channel; and
 adjusting radio resource allocation based at least in part on channel quality reports received from the mobile terminal over the same uplink channel during successive reporting intervals.

16. The method of claim 15, wherein directing the mobile terminal to report individual channel quality measurements for the different frequency carriers over the same uplink channel during successive reporting intervals comprises directing the mobile terminal to report only the channel quality measurements that satisfy a threshold criteria.

17. The method of claim 15, wherein directing the mobile terminal to report individual channel quality measurements for the different frequency carriers over the same uplink channel during successive reporting intervals comprises directing the mobile terminal to report individual ones of the channel quality measurements during consecutive reporting intervals.

18. The method of claim 17, further comprising directing the mobile terminal to skip one or more reporting intervals before revised channel quality measurements for the different frequency carriers are subsequently reported by the mobile terminal over the same uplink channel during successive reporting intervals.

19. The method of claim 15, wherein directing the mobile terminal to report individual channel quality measurements for the different frequency carriers over the same uplink channel during successive reporting intervals comprises directing the mobile terminal to skip one or more consecutive reporting intervals between successively reported channel quality measurements.

20. The method of claim 15, wherein directing the mobile terminal to report individual channel quality measurements for the different frequency carriers over the same uplink channel during successive reporting intervals comprises directing the mobile terminal to rank the channel quality measurements and report the channel quality measurements in order based on rank.

21. The method of claim 20, further comprising directing the mobile terminal to report a frequency carrier identity associated with each reported channel quality measurement.

22. A radio access network comprising a base station configured to:
    transmit data symbols to a mobile terminal on a plurality of frequency carriers in a multi-carrier CDMA environment;
    direct the mobile terminal to report individual channel quality measurements for the different frequency carriers over the same uplink channel during successive reporting intervals, the mobile terminal to report the individual channel quality measurements by:
        mapping a best channel quality measurement of the individual ones of the channel quality measurements to a channel quality indicator index,
        determining a delta from the channel quality indicator index for one or more of remaining frequency carriers based on its corresponding channel quality measurement, and
        reporting the channel quality indicator index and individual deltas over the same uplink channel during successive reporting intervals;
    direct the mobile terminal, via a physical layer or MAC layer signaling message, to stop reporting channel quality measurements for one or more reporting intervals for one or more frequency carriers over the same uplink channel; and
    adjust radio resource allocation based at least in part on channel quality reports received from the mobile terminal over the same uplink channel during successive reporting intervals.

23. The radio access network of claim 22, wherein the base station is configured to direct the mobile terminal to report only the channel quality measurements that satisfy a threshold criteria.

24. The radio access network of claim 22, wherein the base station is configured to direct the mobile terminal to report individual ones of the channel quality measurements during consecutive reporting intervals.

25. The radio access network of claim 24, wherein the base station is configured to direct the mobile terminal to skip one or more reporting intervals before revised channel quality measurements for the different frequency carriers are subsequently reported by the mobile terminal over the same uplink channel during successive reporting intervals.

26. The radio access network of claim 22, wherein the base station is configured to direct the mobile terminal to skip one or more consecutive reporting intervals between successively reported channel quality measurements.

27. The radio access network of claim 22, wherein the base station is configured to direct the mobile terminal to rank the channel quality measurements and report the channel quality measurements in order based on rank.

28. The radio access network of claim 27, wherein the base station is further configured to direct the mobile terminal to report a frequency carrier identity associated with each reported channel quality measurement.

29. The method of claim 1, wherein stopping the reporting of the one or more channel quality measurements over the same uplink channel during successive reporting intervals comprises stopping the reporting for one or more reporting intervals until channel quality measurements for the different frequency carriers are subsequently reported over the same uplink channel during consecutive reporting intervals.

30. The mobile terminal of claim 8, wherein the baseband processor is configured to stop the reporting of one or more channel quality measurements for one or more frequency carriers for one or more reporting intervals until channel quality measurements for the different frequency carriers are subsequently reported over the same uplink channel during consecutive reporting intervals.

31. The method of claim 15, wherein directing the mobile terminal to stop reporting channel quality measurements comprises directing the mobile terminal to stop reporting the one or more channel quality measurements for the one or more frequency carriers for the one or more reporting intervals until channel quality measurements for the different frequency carriers are subsequently reported over the same uplink channel during consecutive reporting intervals.

32. The radio access network of claim 22, wherein the base station is configured to direct the mobile terminal to stop reporting channel quality measurements for one or more reporting intervals for one or more frequency carriers over the same uplink channel until channel quality measurements for the different frequency carriers are subsequently reported by the mobile terminal over the same uplink channel during successive reporting intervals.

\* \* \* \* \*